(12) United States Patent
Mackay

(10) Patent No.: US 9,440,795 B2
(45) Date of Patent: Sep. 13, 2016

(54) APPARATUS AND METHOD FOR MASS STERILIZATION AND PASTEURIZATION OF FOOD PRODUCTS

(71) Applicant: TEO, INC., San Diego, CA (US)

(72) Inventor: Jeffrey H. Mackay, San Diego, CA (US)

(73) Assignee: TEO, INC., San Diego, CA (US)

( * ) Notice: Subject to any disclaimer, the term of this patent is extended or adjusted under 35 U.S.C. 154(b) by 208 days.

(21) Appl. No.: 14/082,911

(22) Filed: Nov. 18, 2013

(65) Prior Publication Data

US 2014/0083820 A1    Mar. 27, 2014

Related U.S. Application Data

(63) Continuation of application No. 12/313,734, filed on Nov. 24, 2008, now Pat. No. 8,586,899.

(51) Int. Cl.
| | |
|---|---|
| *H05B 6/78* | (2006.01) |
| *B65G 33/06* | (2006.01) |
| *A23L 3/01* | (2006.01) |
| *A23L 3/015* | (2006.01) |

(52) U.S. Cl.
CPC ............ *B65G 33/06* (2013.01); *A23L 3/01* (2013.01); *A23L 3/0155* (2013.01); *H05B 6/782* (2013.01); *H05B 2206/045* (2013.01)

(58) Field of Classification Search
CPC ....... A23L 3/01; A23L 3/0155; H05B 6/782; H05B 2206/045; B65G 33/06
USPC .......... 219/687, 701, 702, 746; 99/249, 355, 99/361, 362; 198/406, 412, 436, 467.1, 198/625
See application file for complete search history.

(56) References Cited

U.S. PATENT DOCUMENTS

| | | | | |
|---|---|---|---|---|
| 1,737,438 A | * | 11/1929 | Stearns ............. | B65G 47/1471 198/393 |
| 4,108,319 A | * | 8/1978 | Kacirek ............. | B65G 57/307 198/625 |
| 4,547,114 A | * | 10/1985 | Watrous ............. | B65H 29/42 198/625 |
| 4,943,207 A | * | 7/1990 | Provan ............. | B65G 59/108 221/222 |
| 5,050,720 A | * | 9/1991 | Crankshaw ............. | B65G 33/06 198/467.1 |
| 5,064,093 A | * | 11/1991 | Davis ............. | B65G 59/108 221/222 |

(Continued)

FOREIGN PATENT DOCUMENTS

EP    1437076 A2 *   7/2004   ............... A21B 1/42

*Primary Examiner* — Thien S Tran
(74) *Attorney, Agent, or Firm* — Russo & Duckworth, LLP; David G. Duckworth

(57) ABSTRACT

An apparatus and method for processing food products is provided. The product conditioning system includes an inlet assembly, a pressurizeable tunnel and an outlet assembly. The inlet and outlet assembly pressure vessels include a pair of vertically extending parallel screws for transporting food products from one end of the pressure vessel to the other. The pressurizeable tunnel includes a heating stage having microwave sources for irradiating food products so as to pasteurize or sterilize prepackaged food. The pressurizeable tunnel further includes a heat maintenance stage and product cooling stage. Both the heat maintenance stage and product cooling stage include vertically extending pressure vessels. Within each pressure vessel, two pairs of parallel rotating screws are positioned for moving food products through a liquid environment at a desired temperature for continued pasteurization or sterilization in the heat maintenance stage, and product cooling within the cooling stage.

12 Claims, 13 Drawing Sheets

(56) References Cited

U.S. PATENT DOCUMENTS

| | | | | |
|---|---|---|---|---|
| 5,310,043 A | * | 5/1994 | Alcorn | B65G 33/06 198/418.7 |
| 5,632,195 A | * | 5/1997 | Zittel | A23B 7/06 134/132 |
| 5,816,570 A | * | 10/1998 | Paradis | B65H 29/42 198/663 |
| 2007/0108089 A1 | * | 5/2007 | Galluch | A21B 3/132 206/558 |

\* cited by examiner

APPARATUS AND METHOD FOR MASS STERILIZATION AND PASTEURIZATION OF FOOD PRODUCTS

RELATED APPLICATIONS

The present application is a continuation application of co-pending U.S. patent application Ser. No. 12/313,734 filed on Nov. 24, 2008.

BACKGROUND OF THE INVENTION

The present invention relates to methods and apparatus for pasteurizing or sterilizing items. More particularly, the invention relates to improved cooking systems, preferably microwave cooking systems, having a plurality of linearly aligned segments for processing food products.

On the practical side, food processing techniques include a cycle of selection and precooking of foods followed by a preservation cycle, which typically includes the use of refrigerators or freezers or retort canning and, in more recent techniques, rapid heating vessels. In food preservation, food can be pasteurized and/or sterilized to reduce the occurrence of food born diseases caused by harmful microorganisms. Pasteurization involves heating food to a temperature, typically between 80° C. and 100° C., sufficient to kill certain pathogenic bacteria and microorganisms. In sterilization, food products are heated to a higher temperature, typically between 100° C. to 140° C., to ensure elimination of more resistant microorganisms and spores. Under practical conditions, to carry out sterilization, it is necessary to heat the product to a temperature above 121° C. for a time of between 5 and 12 minutes. Preferably, the product is subsequently subjected to the most rapid possible cooling to a temperature equal to or less than 35° C. Pasteurization and sterilization, collectively referred to herein simply as "food processing", allows perishable food products to be stored in refrigerated or room temperature conditions for an extended period of time.

More traditional methods for pasteurizing and sterilizing food products involves use of convectional heating processes in which thermal energy is transferred to the food product in a high or medium temperature environment utilizing hot air, hot water, or hot vapor within an oven-type construction. In some cases, where preservation on an industrial scale is required, a post pasteurization or sterilization phase is required which may not be limited to attenuation of microbial, pathogenic and enzymatic activity, but has the purpose of destroying all microorganisms present in the product, and also in the actual container/package. This occurs, because the degree of resistance to heat of microorganisms is related to external and environmental factors, like the initial microbial concentration of the medium, the characteristics of the medium itself and the time and temperature parameters, as well as intrinsic factors related to heat sensitivity of germs and development stage of the cells, in which specific variations often occur. For example, under identical environmental conditions, it is observed that fungi and yeast are more resistant than *e. coli* bacteria and, within the latter, the rod forms are more resistant that the coccal forms.

In order to efficiently effect pasteurization and/or sterilization, microwave heating has been employed for pasteurization and sterilization. Advantageously, microwave heating can provide for pasteurization and/or sterilization in a much shorter time period than by employing conventional heating processes. By decreasing the food heating time, food generally tastes better and nutrient retention is improved. In addition, microwave systems typically are more energy efficient than conventional heating systems.

Great Britain Patent No. 1103597 (Newton et al.) describes a microwave heating system for controlling microorganisms in prepared foods and beverages. It prescribes for exposure of the already prepared foods to electromagnetic waves with a frequency of 20-40 MHz at an intensity of 500-3000 volts for a sufficient period of time to attenuate the microorganisms present in the manufactured product. The use of microwave energy to sterilize materials is known in even greater detail. For example, WO0102023 (Korchagin) proposes a generator that has the capacity to implement the intensity of the electromagnetic field at a level to ensure destruction of microorganisms.

Complex apparatuses, specifically continuous treatment tunnels for sanitization of packaged products, have been known since at least 1973. For example, U.S. Pat. No. 3,747,296 (Zausner) proposes an apparatus with linear development, in which filled containers are introduced and subsequently closed. The containers are passed through the tunnel, which is subdivided into different treatment zones at temperatures between 90° C. and 150° C. Means of irradiation are also provided, which have the purpose of sterilizing the cover only. Similarly, U.S. Pat. Nos. 5,066,503; 5,074,200; 5,919,506 and 6,039,991 issued to Ruozi describe conveyor driven microwave processing plants for pasteurizing, cooking and sterilizing food products. The systems include a plurality of chambers wherein the temperature and pressure are controllably elevated and decreased as the food products travel from chamber to chamber.

U.S. Pat. No. 3,889,009 (Lipoma) describes a conditioning tunnel for foods previously prepared in bowls and sealed under pressure. At the entry and exit of this tunnel, corresponding to the crossing point of the manufactured vessels, pressure closure doors are provided. Once the sealed vessels have entered the interior of the tunnel, each vessel undergoes a sterilization treatment, passing beneath a source of electromagnetic waves. Each vessel is then transferred downline, always by means of a common belt or chain conveyor, to pass through a cooling unit. A device to generate pressure during the sterilization phase operates within the apparatus to avoid a situation in which the products, because of the process, burst because of the dilation effect, or from seal failure. This phenomenon most frequently entails escape of liquid from individual containers, producing not insignificant drawbacks within the apparatus, like accumulation of dirt and the subsequent need to carry out frequent maintenance.

Other microwave tunnel apparatuses are also known. For example, Italian companies Modo Group International from Brescia Italy and Micromac from Reggio Emilia developed automatic and computerized food processing tunnels which provided for receiving the products, in this case prepared dishes in a heat-sealed vessel, and for carrying out the fundamental phases of sterilization treatment. The tunnels include elongate cylindrical constructions have diametrically round cross sections, within which, corresponding to the different stages, the following process phases were conducted: 1) preheating; 2) sterilizing using devices that generate microwaves; 3) holding or stabilization of the product at the sterilization temperature for a specified time (microwave sources, which are positioned along the lower side of the conditioning tunnel beneath or corresponding to the plane of advance of the prepared foods, are typically provided to execute at least these last two phases); and 4) cooling before unloading. At the end of the process, a finished product emerges, sterilized and ready to be packaged and stored in warehouses.

More recently, U.S. Pat. No. 7,119,313, assigned to Washington State University Research Foundation, describes a tunnel for pasteurizing and/or sterilizing food. The tunnel includes a plurality of chambers in which microwave sources are positioned on each side of a microwave cavity in which food products are heated. This reference describes pressurizing the microwave cavity and filling it with a liquid in an effort to balance the pressure generated in the food packaging to therefore prevent the packaging from bursting or otherwise opening.

Unfortunately, the aforementioned food processing systems suffer from numerous disadvantages. Foremost, though several of the prior art references describe pressurized food processing chambers, none of the references describe an efficient manner for introducing products into a microwave tunnel without a significant loss of internal pressure to the external environment as packages are introduced. Presumably in practice, the prior art systems require that the pressurizeable chambers be opened for the introduction of food products. Thereafter, the chambers are closed and pressurized to a desired pressure while subsequently or simultaneously activating a microwave heating source for heating the products. Presumably, the food products are expelled from the food processing system in similar manner requiring that the heating chambers be depressurized, one or more doors opened and the products transported from inside the heating chamber to exterior to the heating chamber. The negative implications from this time consuming and complicated intermittent process has made commercialization of pressurized microwave pasteurization and sterilization impractical.

Thus, there is plainly a need for a food processing system which will efficiently and economically provide for the introduction and transportation of food products through a pressurized microwave cooking process.

Advantageously, the food conditioning system would not require the time consuming and impractical process of continuously pressurizing and depressurizing various heating cavities for the introduction and expulsion of food products and their packages.

Even more advantageously, a preferred food conditioning system would provide for efficient holding and cooling chambers for maintaining and cooling products at desired temperatures while permitting the products to continuously move, without starting and stopping, to increase efficiency.

SUMMARY OF THE INVENTION

Briefly, in accordance with the invention, an improved apparatus and method for processing products is provided, primarily for food pasteurization and sterilization. The conditioning system is especially adapted for the processing of food in trays or bowls which have been previously sealed.

The product conditioning system is subdivided into various pressurizeable stages including an inlet assembly stage, a tunnel section including at least one heating stage for heating products, as well as an outlet assembly. Preferably, the pressurizeable tunnel is also divided to include a temperature maintenance stage for maintaining the products at a desired temperature for a desired time period, as well as a cooling stage for cooling the food products to a desired temperature. The heating stage includes one or more microwave sources and accompanying wave guides for heating the food products. In addition, the pressurizeable tunnel is preferably connected to an active pressure control system for providing pressure equalization within the heat sealed packages. The active pressure control system may incorporate various structures known to those skilled in the art including, but not limited to, the use of pressurized cylinders, electric or combustion powered gas compressors, or hydraulic compressors, all of which may preferably be controlled by computer processors. The microwave sources may also be constructed in various configurations as can be determined by those skilled in the art. Preferably, the heating chamber has a quadrilateral cross-section and the microwave sources provide both top-side irradiation and bottom-side irradiation for products conveyed through the quadrilateral tunnel.

The pressurizeable tunnel and corresponding heating chamber is liquid and gas tight from the outside environment so as to be pressurizeable, and preferably fillable with a liquid such as water. To maintain pressure within the heating chamber, the product conditioning unit includes an inlet assembly providing a pressure seal as well as an outlet assembly providing a pressure seal while the packages are conveyed throughout the sterilization system.

The inlet, heating, temperature hold, cooling and output sections may be oriented in any direction as the system does not rely on gravity in its method of transport within the system. It is desirable for the Input entry opening and output exit opening to be located at the highest point in the system to minimize air introduction into the system. Vertical positioning may be desirable in most factory settings to minimize floor area footprint.

The inlet pressure assembly includes a pair of what are referred to herein as "screwstacks". Each screwstack includes a hollow pressure vessel which is preferably cylindrical and positioned vertically. Each screwstack further includes an entry opening, openable and closeable by a door, for introduction of food products. In addition, each screwstack includes a exit opening, which is openable and closeable by a second door, for the expulsion of food products from the interior of each screwstack. The exit opening of each inlet assembly screwstack is connected to the pressurizeable tunnel by sealed conduits or intermediate chambers.

Preferably, each screwstack is cylindrical and positioned vertically with a first entry opening projecting through the screwstack's sidewall near the top of the screwstack. Conversely, preferably the inlet assembly's screwstacks have their exit openings positioned to project through the sidewalls near each screwstack bottom.

Each of the inlet assembly screwstacks include a pair of vertically extending threaded screws positioned within the screwstack's hollow interior. Each screw is rotatable and positioned parallel to one another with a space between them so that product packages can be received within the screwstack threads. After passing through the screwstack entry door and upon rotation of the parallel screws, packages are conveyed from the inlet assembly's entry opening to the inlet assembly's exit opening so as to be conveyed to the conditioning unit's pressurizeable tunnel.

The outlet assembly has a similar construction to the inlet assembly. Specifically, the outlet assembly includes two hollow screwstack assemblies which include cylindrical pressure vessels which are positioned to extend vertically. Each of the outlet assembly screwstacks also include a first entry opening and a second exit opening, openable and closeable by corresponding gaseous tight doors. As opposed to the construction of the inlet assembly, preferably each of the outlet assembly screwstacks' entry openings is positioned near the bottom of the screwstack and the exit opening is positioned at the screwstack's upper extremity. Each of the outlet assembly screwstacks also includes a pair of vertically extending screws positioned parallel to each other and spaced so as to position food packages between the threads of adjacent screws. Again, rotation of the parallel thread causes the food products to be transported downline through the outlet assembly from the screwstack's first entry door to the screwstack's second exit door.

The inlet assembly, pressurizeable tunnel including heating stage, and outlet assembly form a liquid and gas tight enclosure. Of importance, in order to maintain increased pressure within the pressurizeable tunnel, the inlet assembly and outlet assembly screwstacks are constructed so that the first entry door is closed when that screwstack's second exit door is opened, and similarly the screwstacks are constructed so that their second exit doors remain closed when their respective first entry doors are opened.

Preferably the doors are controlled by mechanical actuators connected to a control processor. The control processor may take various forms including all software and processing conducted within a single computer chip. Alternatively, the control processor may utilize a plurality of processors connected to actuators for opening and closing the various screwstack doors. Preferably, the control processor also controls the rotation of the various screwstack screws so as to selectively rotate and transport packages from downline through the product's conditioning unit.

In operation, an inlet assembly first screwstack is loaded with packages by the control processor opening a screwstack first entry door while maintaining that screwstack's second exit door in a closed condition. The screwstack's internal screws are rotated to receive food products, preferably encapsulated in food packaging, into the interior of the screwstack. The parallel screws are rotated until the screwstack is filled with food products. The screwstacks can be constructed to store any number of prepackaged food products. However, it is preferred that each of the screwstacks is capable of storing and stacking at least 10 food products. Even more preferably, each screwstack is capable of storing and stacking 50 or more food products. Once the inlet assembly first screwstack is filled with food products by rotation of the internal screws, the first entry door is closed, pressure equalization occurs to match the system's internal pressure and thereafter the screwstack's second exit door is opened. Of importance, at least one door of a screwstack is closed at all times to maintain a pressure seal within the entire assembly. Once the inlet assembly's second door has been opened, the screwstack's internal screws are again rotated to convey the food products downline through the system. Preferably, a mechanical actuator or the like is positioned within the screwstack to move packages from interior of the screwstack downline into the pressurizeable tunnel's heating stage. Once the screwstack has been emptied of food products, the screwstack exit door is closed and thereafter the screwstack's entry door is opened for once again introduction of food products into the screwstack.

In order to continuously convey food products through the product conditioning unit and heating stage without stopping for a first screwstack to refill with food products, the operation of the respective inlet assembly screwstacks is alternated so that while one screwstack is receiving and loading products into its interior, the other screwstack is expelling products from its interior into the pressurizeable tunnel. More specifically, the controller controls the second screwstack to load food products into the interior of the second screwstack while the first screwstack is conveying products from interior to its screwstack into the pressurizeable tunnel. Thereafter, the controller causes the second screwstack to convey products through its exit opening while the first screwstack is loading food products into its interior.

The conditioning system's outlet assembly provides for the expulsion of the food products from the pressurizeable tunnel in similar manner to the inlet assembly introducing food products into the pressurizeable tunnel. Specifically, the outlet assembly's screwstacks alternatively operate to fill with products by opening their first entry door and rotating the internal screws to receive food products into the screwstack's interior. Simultaneously, the other screwstack has its second exit door opened and its internal screws are rotated to move product out the second exit door. Again, when a screwstack's entry door or exit door is opened, its corresponding exit or entry door is closed to maintain a liquid and/or gas tight environment within the pressurizeable tunnel; pressure equalization also occurs to match the system's internal pressure.

Preferably, the pressurizeable tunnel includes one or more stages for maintaining food products at a desired temperature for a desired time period. Preferably, a temperature maintenance stage is constructed to include one or more vertically extending cylindrical screwstacks. Each maintenance stage screwstack includes an entry opening for the receipt of food products and an exit opening for the expulsion of food products. Preferably, the maintenance stage screwstack includes two pairs of vertically extending threaded screws positioned within the screwstack's central cavity. Preferably, the maintenance stage screwstack's entry and exit openings are positioned near the same extremity of the screwstack.

A first pair of parallel screws are positioned to hold products between the parallel screws so as to convey food products from the entry opening to the opposite extremity of the screwstack. Thereafter, a mechanical actuator located within the screwstack forces food products from the first pair of screws to the second pair of screws. Products encountering the second set of screws are then conveyed in the opposite direction as provided by the first set of screws until products are conveyed the entire length of the screwstack toward the screwstack's exit door where they are then expelled to another stage of the pressurized tunnel or expelled to the outlet assembly for expulsion from the product conditioning unit.

The pressurized tunnel may have any number of temperature maintenance screwstacks forming heating stages and/or cooling stages. In a preferred embodiment, the pressurizeable tunnel has one to three maintenance screwstacks for maintaining the food product at a sufficiently high temperature to provide food sanitization, such as at a temperature of above 121° C. Preferably the pressurizeable tunnel also has several temperature maintenance screwstacks for cooling the products to room temperature or below. In a preferred embodiment, the pressurizeable tunnel has four to seven temperature maintenance screwstacks positioned immediately upline to the outlet assembly which are dedicated to cooling the product for expulsion from the food processing system.

Preferably, the conveyor system for transporting products through the food processing system is fully automated and controlled by the control processor, for moving products downline through the system. In addition, the automated conveyer system may include various mechanical apparatus, such as a belt drive, for conveying food products through the pressurizeable tunnel including its horizontally aligned heating stage. In a preferred embodiment, a belt drive is employed in which parallel belts engage the sides of the products without any mechanical apparatus engaging the top or bottom of the product to convey products through the heating stage. A preferred drive belt system is described in a pending U.S. Provisional application entitled 'Package Conveyor for Continuous Process Microwave Applicator', U.S. Provisional Ser. No. 61/192,687 filed Sep. 19, 2008, which is hereby incorporated by reference in its entirety.

The present invention optimizes the sterilization cycles of food products including heating, temperature stabilization and cooling while within a pressurized environment to inhibit package bursting or leaking. This objective is made possible by providing a product conditioning unit allowing for the introduction of food products and expulsion of food products through a pressurized environment without having to pressurize and depressurize the system with the introduction of new products.

Advantageously, the food conditioning system of the present invention is a commercially-compatible continuous process that is inexpensive to manufacture, economically efficient to prepare food products for sale, and fits within a small manufacturing footprint.

The invention is an efficient method of providing a continuous flow of product into and out of a pressurized conditioning unit. This invention is a significant improvement to a microwave system providing an even and constant flow of product through the energy exposure areas, improving energy absorption patterns, process efficiencies and product quality.

These and other advantages of the invention will be apparent from the detailed description taken in conjunction with the drawings.

DETAILED DESCRIPTION OF THE INVENTION

Figure 1:
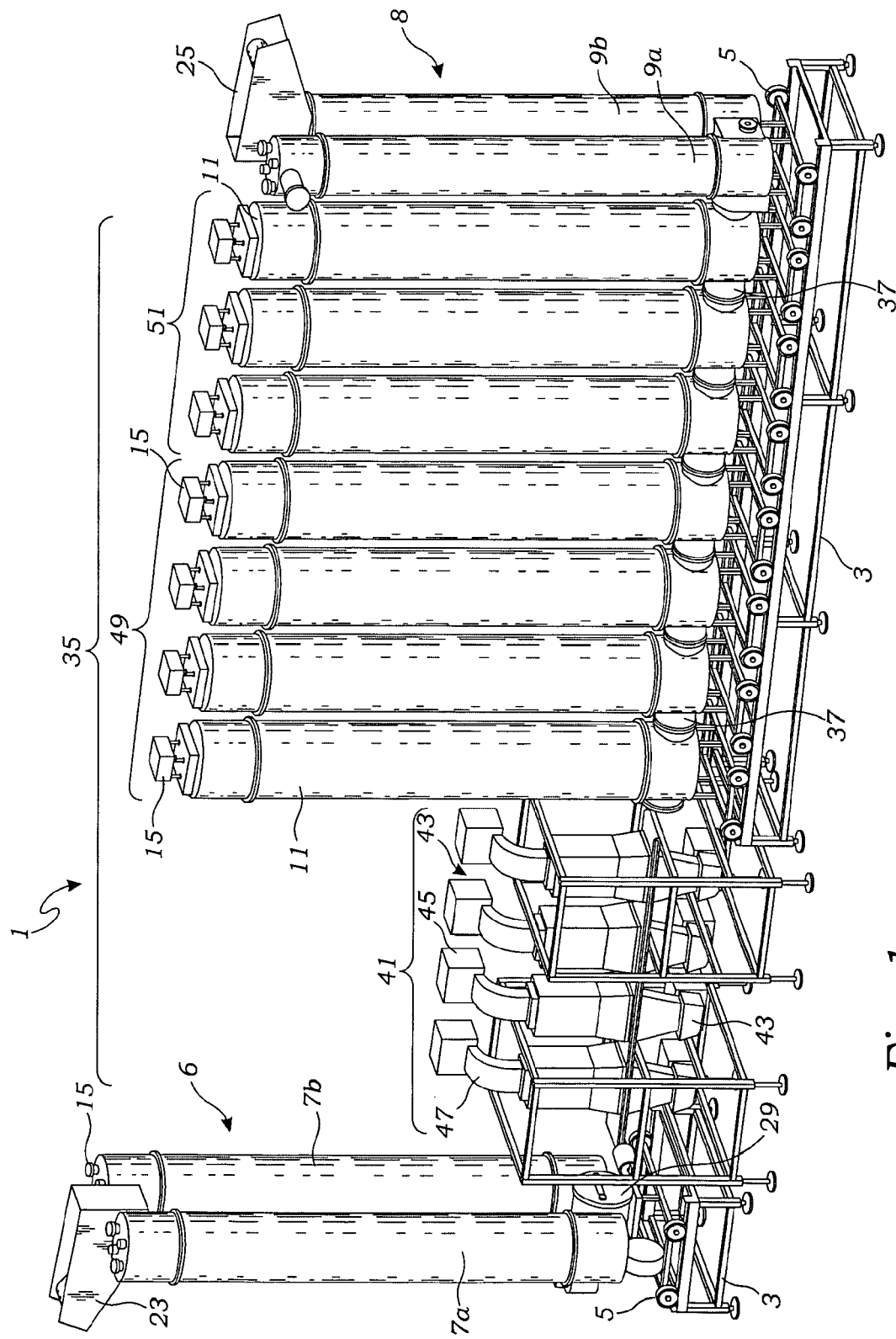
FIG. 1 is a perspective view of the food processing system of the present invention.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to specific embodiments illustrated.

With reference to the figures, the food processing system 1 includes three primary components comprised of an inlet assembly 6, an intermediate pressurizeable tunnel section 35, and an outlet assembly 8. The inlet assembly 6 provides for the introduction of food products into the food processing system without requiring depressurization of the pressurizeable tunnel. Similarly, the outlet assembly provides for the expulsion of food products from the food processing system without requiring depressurization of the pressurizeable tunnel.

Figure 11:
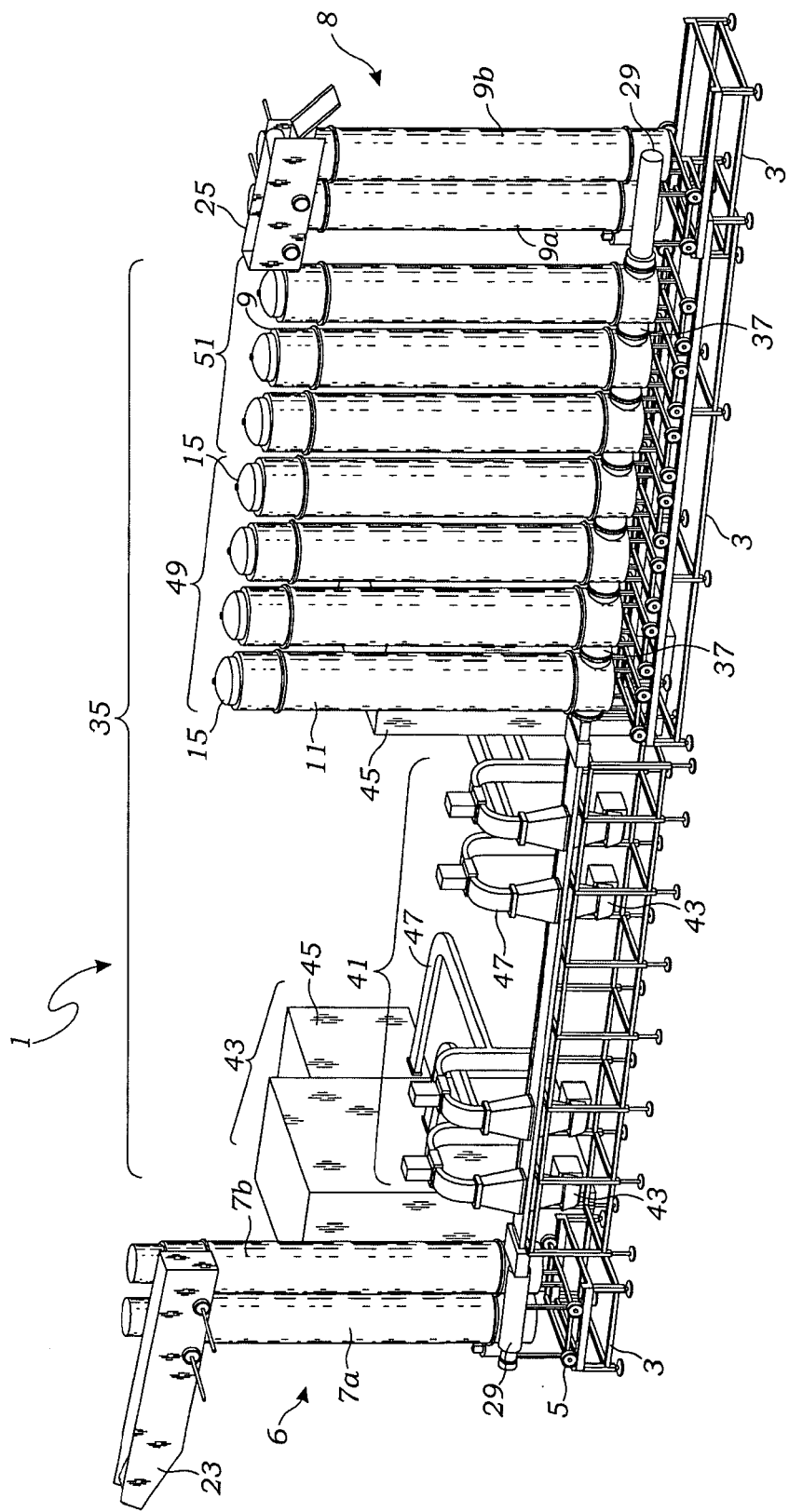
FIG. 11 is a perspective view of the food processing system's of the present invention wherein the inlet assembly and outlet assembly have screwstacks positioned side-by-side in an upline to downline configuration.
Figure 12:
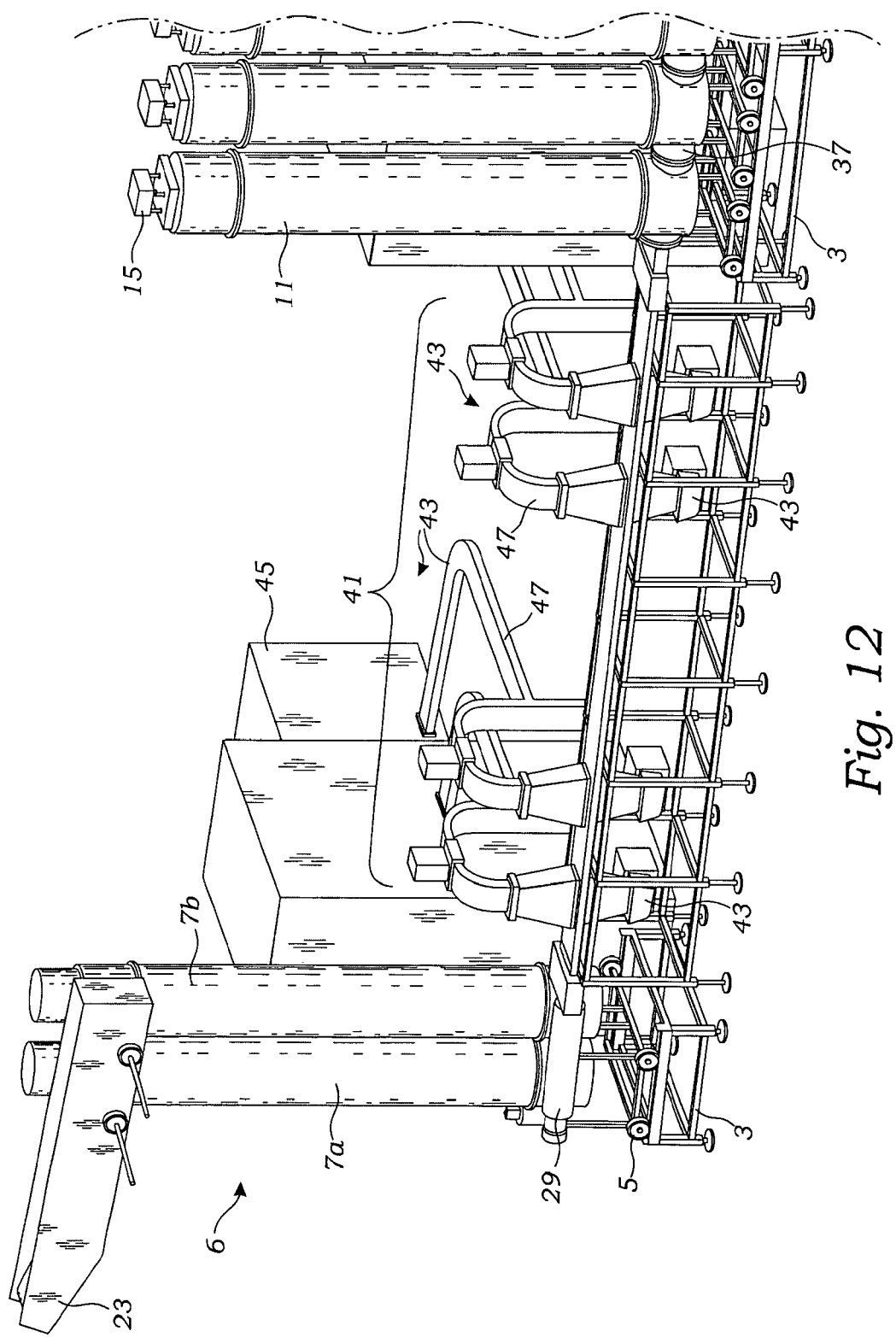
FIG. 12 is a close-up perspective view illustrating the inlet assembly having inlet screwstacks positioned side-by-side in an upline to downline configuration.

With reference primarily to FIGS. 1-4 and FIGS. 11-13, the inlet assembly 6 includes a pair of inlet screwstacks 7a and 7b. As illustrated in FIGS. 1-4, the screwstacks 7a and 7b may be positioned laterally adjacent to one another relative to the longitudinal path of the food processing system 1. Alternatively, as illustrated in FIGS. 11-12, the screwstacks 7a and 7b may be positioned longitudinally adjacent to one another relative to food processing system 1.

Figure 2:
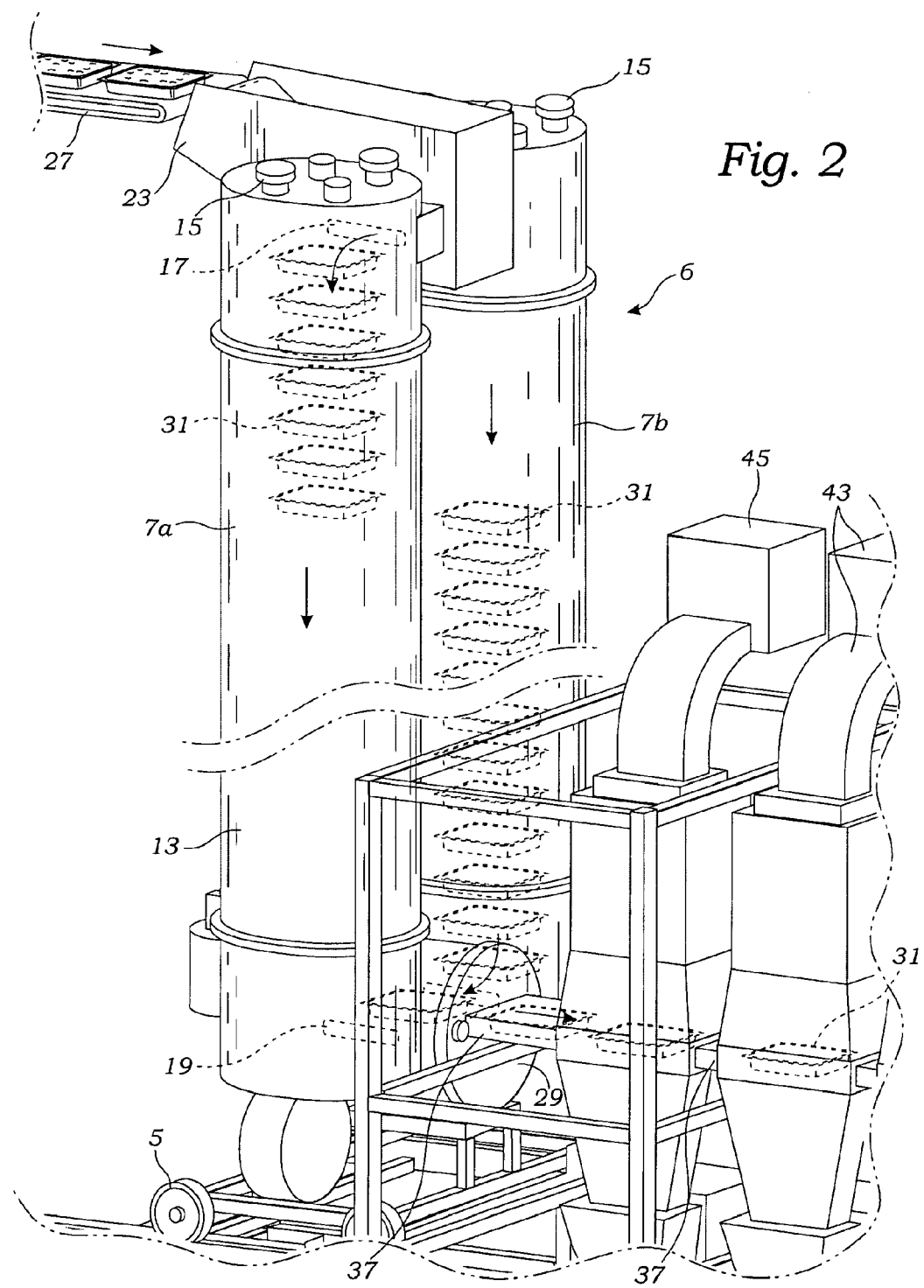
FIG. 2 is a perspective view of the food processing system's inlet assembly of the present invention.

Each of the screwstacks includes a hollow pressure vessel 13 which is preferably vertically aligned. As illustrated best in FIG. 4, each screwstack further includes an entry opening 17, openable and closeable by a door 18, at its upper extremity for the introduction of food products 31. Of importance, the door 18 provides a liquid and gaseous tight seal so that the screwstack can be pressurized. With reference to FIG. 2, at the bottom of each inlet screwstack 7a and 7b, a second opening 19 is provided which is openable and closeable by an exit door. Again, the exit door provides a liquid and gaseous tight seal when the door is closed.

Figure 3:
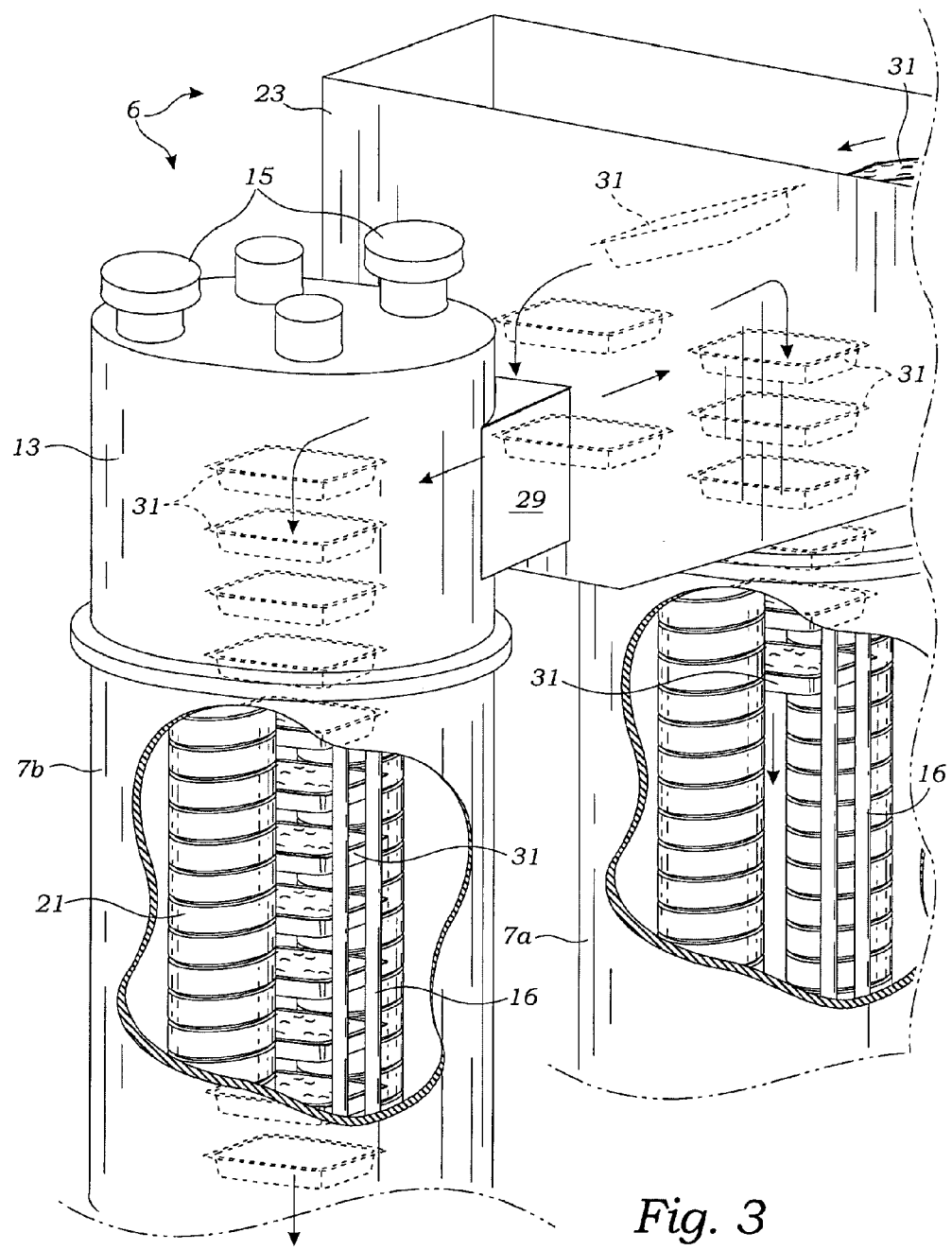
FIG. 3 is a rear close-up perspective view of the food processing system's inlet assembly illustrated in FIG. 2.

Each of the inlet screwstacks 7a and 7b further includes a pair of vertically extending threaded screws 21 positioned within the screwstacks' hollow interior. Each screw 21 is rotatable by a motor 15 and includes a plurality of threads 23. The screws are positioned parallel to one another to provide a space sized so that products can be positioned and maintained between the adjacent threads 23 of the respective screws 21. The rotation of the screws causes food products 31 to move vertically through the inlet screwstack's interior. More specifically, food products 31 are introduced into each inlet screwstack's entry opening 17 when the entry door 18 is in an open condition. Rotation of the screws 21 causes food products to be transported downline from the screwstack's entry opening 17 to the screwstack's exit opening. As illustrated in FIG. 3, vertically extending alignment rods or other guide assemblies 16 may be employed to properly maintain the products 31 between the parallel screws while traveling vertically within the screwstack.

Of importance, the inlet assembly screwstacks are operated so that the first entry opening 17 is closed by the entry door 18 when the respective screwstack's second exit opening is opened. Conversely, the operation of the screwstacks is controlled so that in the event that the entry opening 17 is open then the screwstack's second exit opening 19 is closed by an exit door 20.

Figure 4:
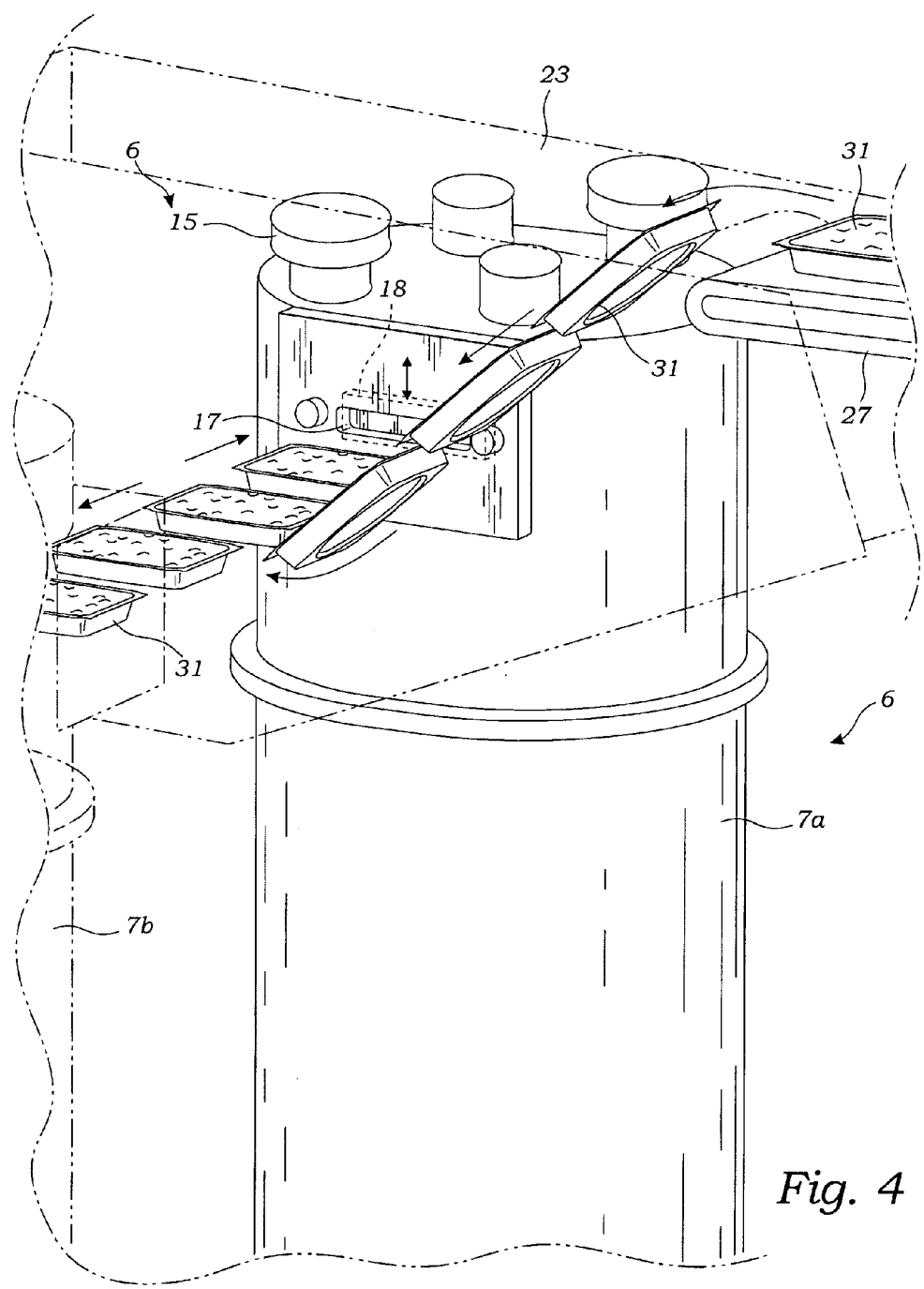
FIG. 4 is a rotated close-up perspective view of the food processing system's inlet assembly shown in FIG. 2 illustrating the conveyance of food products into the inlet assembly.

With reference to FIGS. 3 and 4, in order to continuously introduce food products into the food processing system 1, the operation of the inlet assembly's respective screwstacks 7a and 7b is alternated so that while one screwstack is receiving and loading food products 31 into its interior, the other screwstack is expelling products through a connecting conduit 37 into the pressurizeable tunnel 35. To introduce food products into the inlet assembly screwstacks 7a and 7b, the food processing system preferably includes a conveyor 27 connected to an inlet hopper 23. The inlet hopper 23 and conveyor 27 transport food products to a sorting chamber 29 which utilizes an internal mechanical actuator (not shown) to selectively introduce food products into a screwstack 7a or 7b.

As illustrated in FIGS. 1, 2, 11 and 12, preferably the inlet assembly 6 also includes a second sorting chamber 29 connected to the inlet screwstack's exit openings 19 for receiving food products 31 from the screwstacks 7a and 7b for transportation to the pressurizeable tunnel 35. Again, the exit openings 19 of the inlet screwstacks 7a and 7b are alternately opened for expulsion of food products 31 into the sorting chamber 29, which in turn includes an internal mechanical actuator (now shown) that transports the food products through a liquid and gaseous tight connecting conduit into the pressurizeable tunnel 35.

Figure 5:
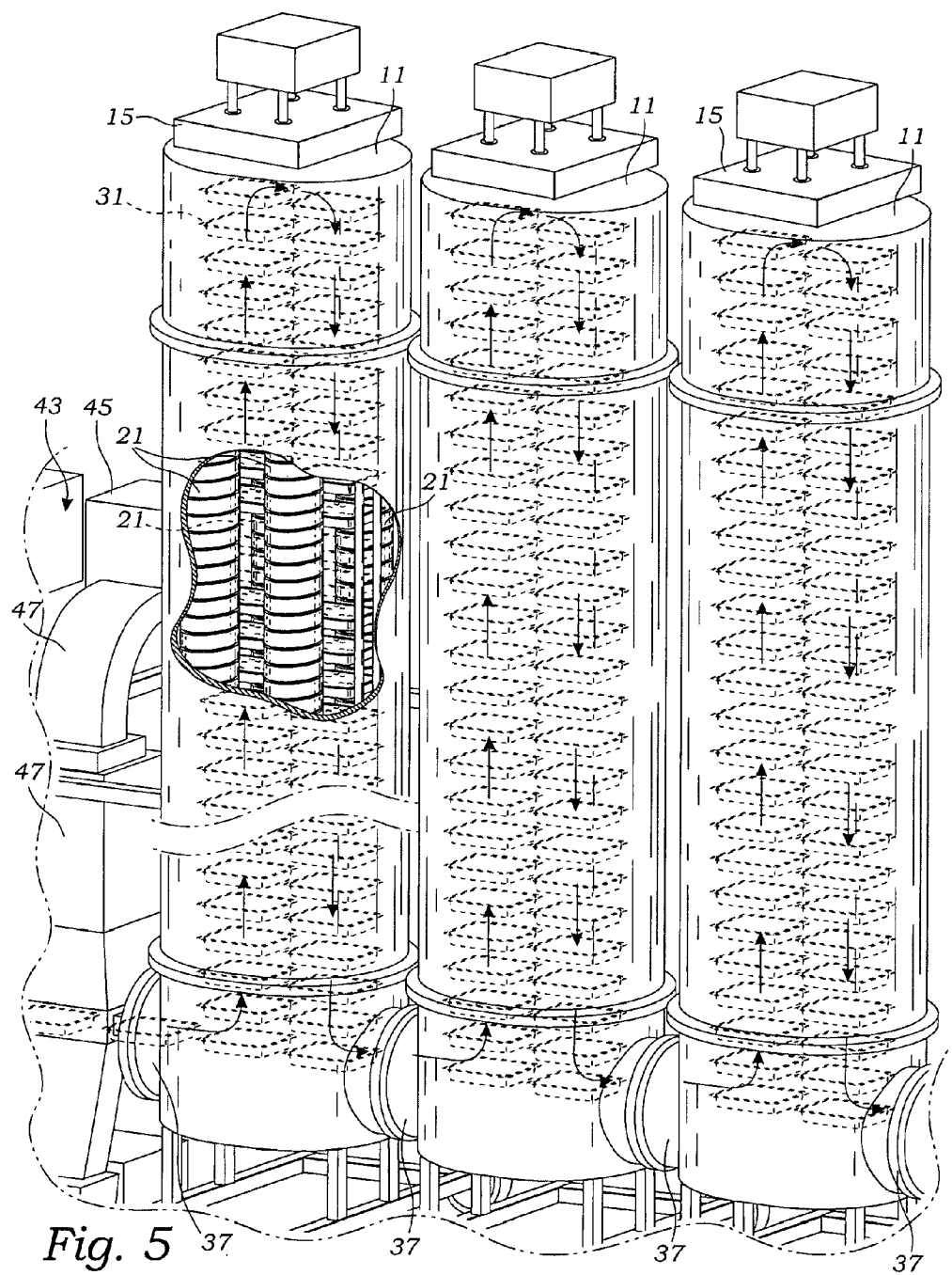
FIG. 5 is a perspective view of the food processing system's temperature maintenance screwstacks of the present invention.
Figure 6:
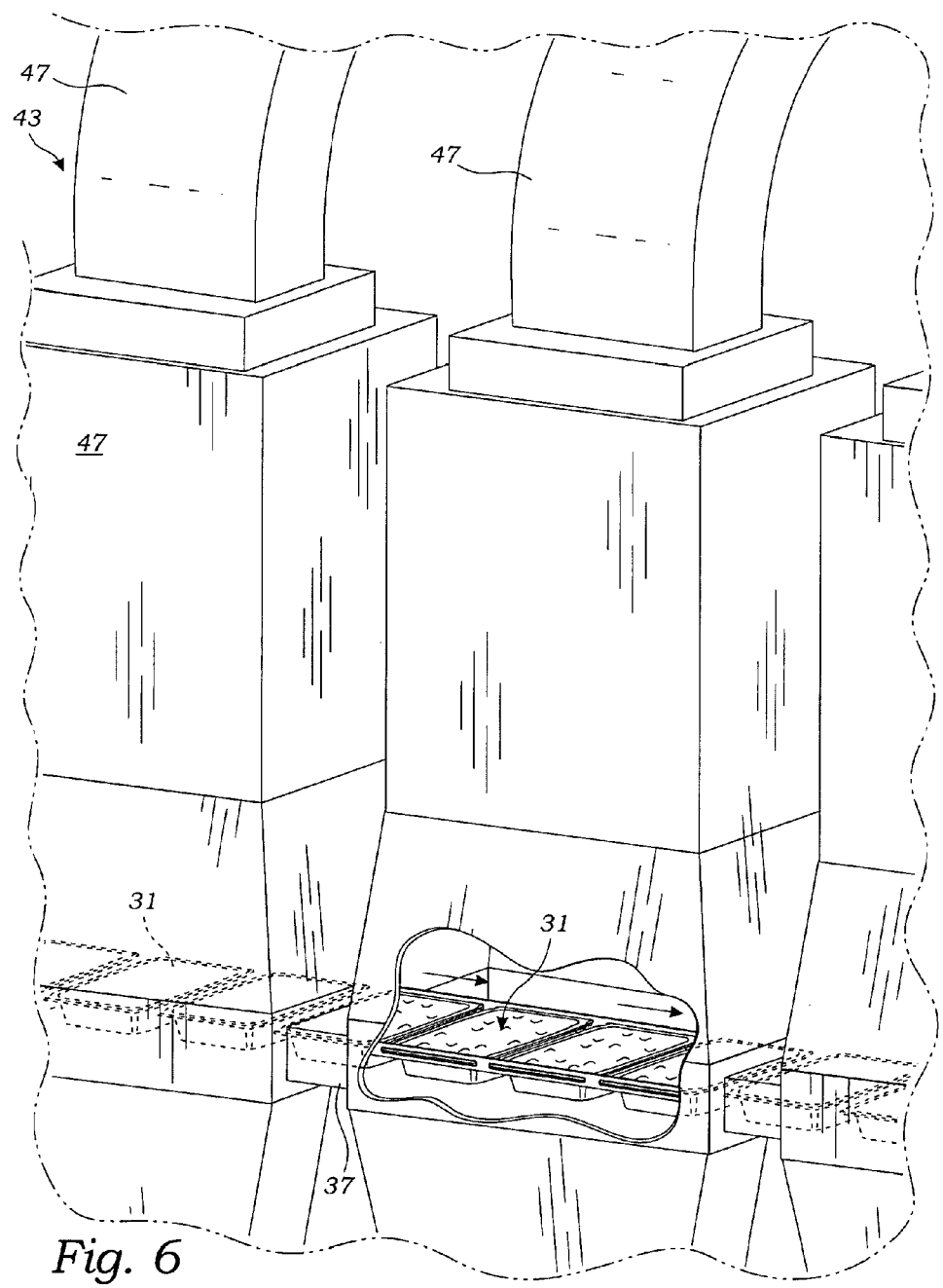
FIG. 6 is a perspective view of the food processing system's heating stage of the present invention.
Figure 14:
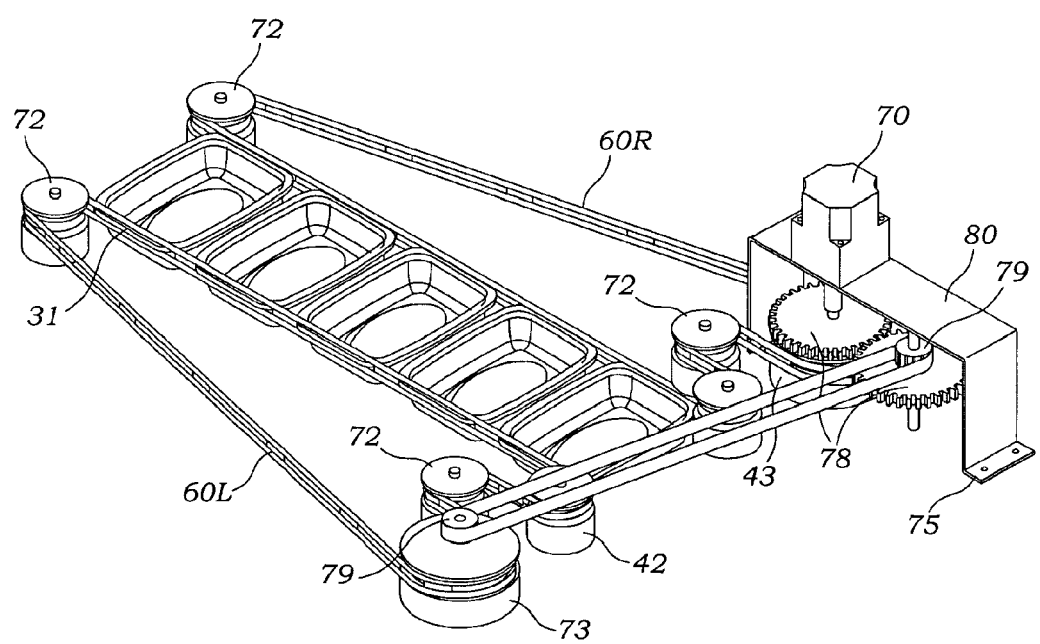
FIG. 14 is a perspective view of the drive belt system for conveying food products through the heating stage.

The pressurizeable tunnel 35 can take various forms. For example, as illustrated in FIGS. 1 and 5, the pressurizeable tunnel may be subdivided into numerous chambers for product processing. Any construction of a pressurizeable tunnel will include at least one heating stage 41. As illustrated in the figures, the heating stage 41 includes at least one microwave source 43, preferably including a plurality of microwave generators 45 and wave guides 47. As illustrated in the figures, a preferred microwave source 43 includes four microwave generators 45 and corresponding wave guides 47 for directing microwave energy downwardly upon the top of food products, and an additional four microwave generators 45 and corresponding wave guides 47 for directing microwaves upwardly upon the bottom of food products. The food products may be conveyed through the heating stage 41 using a wide variety of mechanical apparatus as can be selected by those skilled in the art. As illustrated in FIGS. 6 and 14, in a preferred embodiment, food products 31 are conveyed through the heating stage without any mechanical apparatus engaging the top or bottom of the products by utilizing a pair of parallel belts having elongate slots sized and positioned to receive the edges of product trays effectively eliminating all massive mechanical conveying apparatus from the microwave exposure area 34.

With reference to FIG. 14, the system for conveying food products through the heating stage preferably employs a conveyor belt system which is mostly disposed within the pressurizeable tunnel's heating stage 41. More particularly, the conveyor system 6 consists primarily of a pair of parallel side-by-side belts 60-L and 60-R which are spaced apart to engage the sides of packages. Preferably, the packages are supported only by the belts 60 and by any buoyancy imparted by the fluid with the heating stage. Preferably, all other mechanical supports or other apparatus are eliminated or spaced a significant distance away from the packages to reduce interference to the microwave field. Thus, the conveyor belts 60 support packages 31 so that the packages 31 are spaced above any apparatus such as the bottom wall of the pressurizeable tunnel 35 while the packages are conveyed through the microwave field.

As illustrated in FIG. 14, a motor 70 and series of belts, gears, and pulleys are used to drive the pair of conveyor belts 60 in synchronism. In particular, these may include a timing belt 74 and first timing belt pulley 79 coupled to motor 70 via drive gears 78 and drive shaft 80. A second timing belt pulley 79 on the far side operates belt drive roller 73. Belt drive roller 73 and various belt guide rollers 72 further provide movement and support for the conveyor belts 60. As illustrated, the motor 70 may be supported by motor bracket 75 above gears 78, pulley 79 and drive shaft 80, but it should be understood that other arrangements are possible.

In operation, a left hand belt 60-L is continuously fed around its respective guide rollers 72 and drive roller 73 (driven by timing belt 74), and a respected right hand belt 60-R is continuously fed around its respective drive roller 73 (driven by one of the gears 78) and its respective guide rollers 72. Left hand belt 60-L and right hand belt 60-R are thus kept in alignment with one another via gears 78, pulleys 79 and timing belt 74. This is necessary to ensure that the packages 31 are conveyed in an orderly fashion.

Though not illustrated, a tension measurement device or other device such as a motion transducer may be used in combination with the belts 60 to provide feedback on package location and condition. The tension measurement devices can be located as part of one of the guidance rollers 72, within the heating stage, or may be part of one of the drive pulleys 72 which may be located outside the heating stage. In addition, belt tensioners may be used to prevent slack in the belts 60. Furthermore, the belts 60 may be perforated to receive sprockets or tabs formed upon drive roller 73 and/or guide roller(s) 72. The sprockets will engage the perforated holes to provide a more positive engagement mechanism between motor 70 and belts 60. The belts themselves are preferably made of a suitable material that is temperature, fluid and microwave energy insensitive. Teflon™, Kevlar™ and fiberglass are examples of suitable materials.

Figure 9:
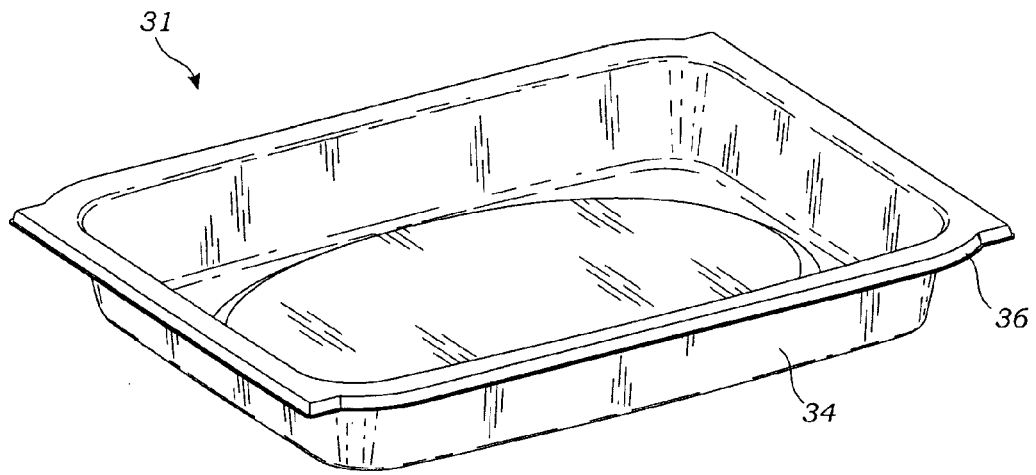
FIG. 9 is a perspective view of a tray for holding food for use with the food processing system of the present invention.
Figure 10:
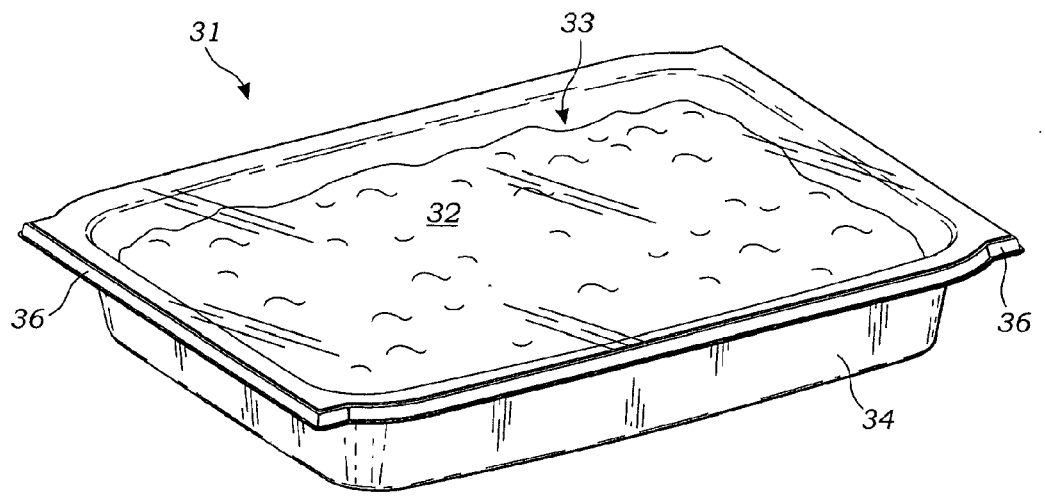
FIG. 10 is a perspective view of a food product including food, packaging tray and cover for use with the food processing system of the present invention.

As illustrated in FIGS. 6, 9 and 10, preferably the food products 31 include a bottom tray 34 and a peelable cover 33 for encapsulating a food product 32. Each of the trays include parallel side lips 36 which extend beyond the traditional edge of the tray for being received within the belt slots.

The pressurizeable tunnel 35 may include a heat maintenance stage 49 for maintaining food products at a desired temperature for a desired time period to kill pathogenic bacteria, spores, and organisms. The pressurizeable tunnel may also include a product cooling stage 51 for cooling products from high temperatures to lower temperatures for ultimate expulsion from the food processing system 1. The temperature maintenance stage, including the sub-stages for heating and cooling of products, utilize temperature maintenance screwstacks 11.

Figure 7:
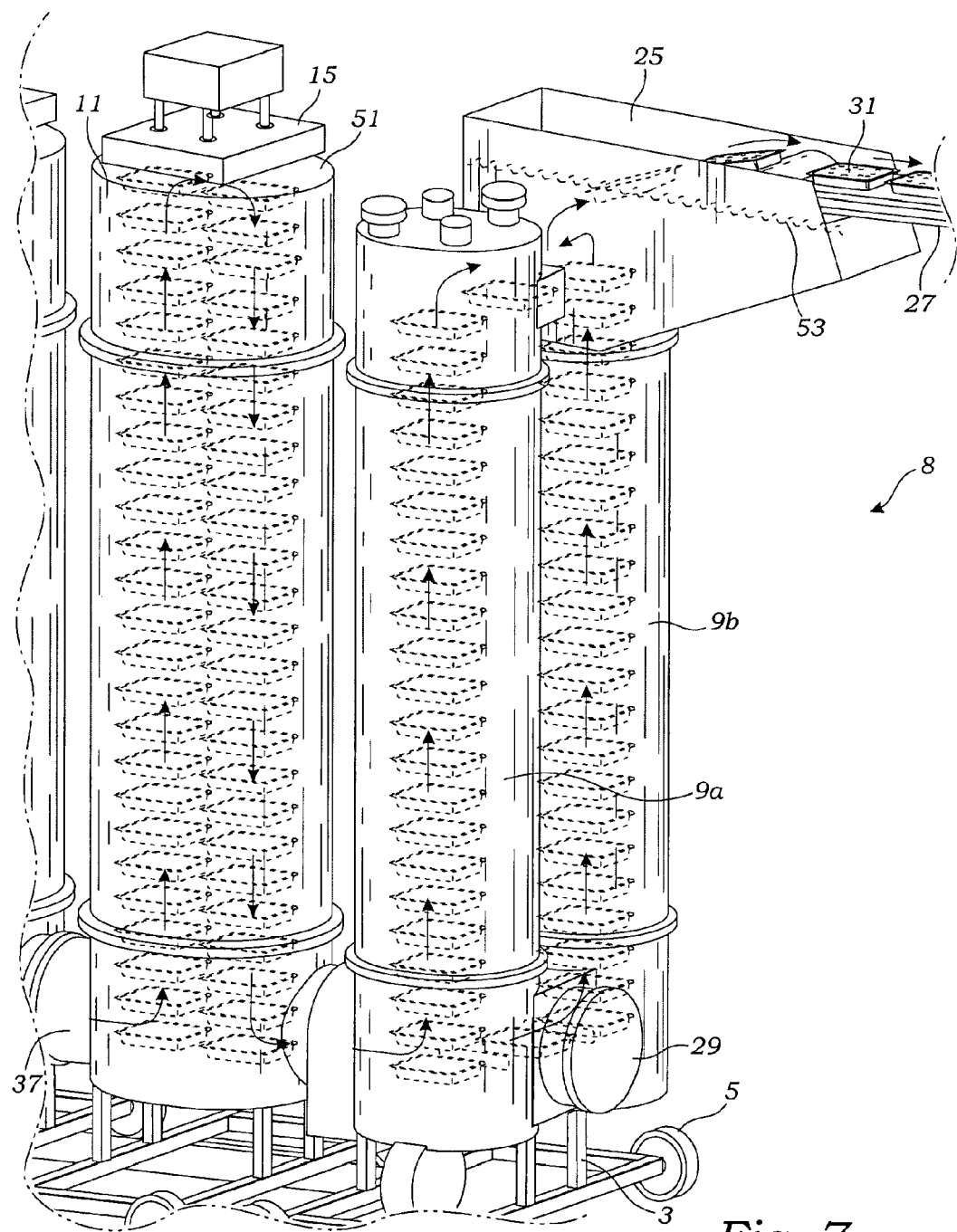
FIG. 7 is a perspective view of the food processing system's outlet assembly of the present invention.

As illustrated in FIGS. 5 and 7, each of the temperature maintenance screwstacks 11 preferably include two pairs of screws 21, as opposed to a single pair of screws within the inlet and outlet assembly screwstacks. Within the temperature maintenance screwstacks 11, a first pair of screws 21 receives the food products 31 which have been introduced into the screwstack through an entry opening 37. The screws 21 are rotated by one or more motors 15 to transport the food products 31 upwardly to the opposite upper extremity of the screwstack where the food products are moved laterally by a mechanical actuator (not shown) to the upper extremity of the other pair of screws 21. The second pair of screws 21 transport the food products downwardly to the bottom of the screwstack 11 until they are ejected by an additional mechanical actuator to an exit opening 19 where they are expelled to an additional temperature maintenance screwstack 11 or introduced into the outlet assembly 8. (See FIG. 7).

Advantageously, the temperature of maintenance screwstacks 11 provide a very small footprint, but a significant travel distance for the food products so that food products are maintained at a proper temperature for a desired time period. As illustrated in FIG. 1, in a preferred embodiment, the heat maintenance stage 49 includes 3 screwstacks 11 for providing a passageway within which the food products will travel for a sufficiently long time period at a desired temperature sufficient to kill pathogenic microorganisms and spores. Meanwhile, a preferred product cooling stage 51 includes 4 screwstacks 11 providing sufficient travel time and distance for the products to cool to a desired temperature before being introduced into the food processing system's outlet assembly 8.

Figure 8:
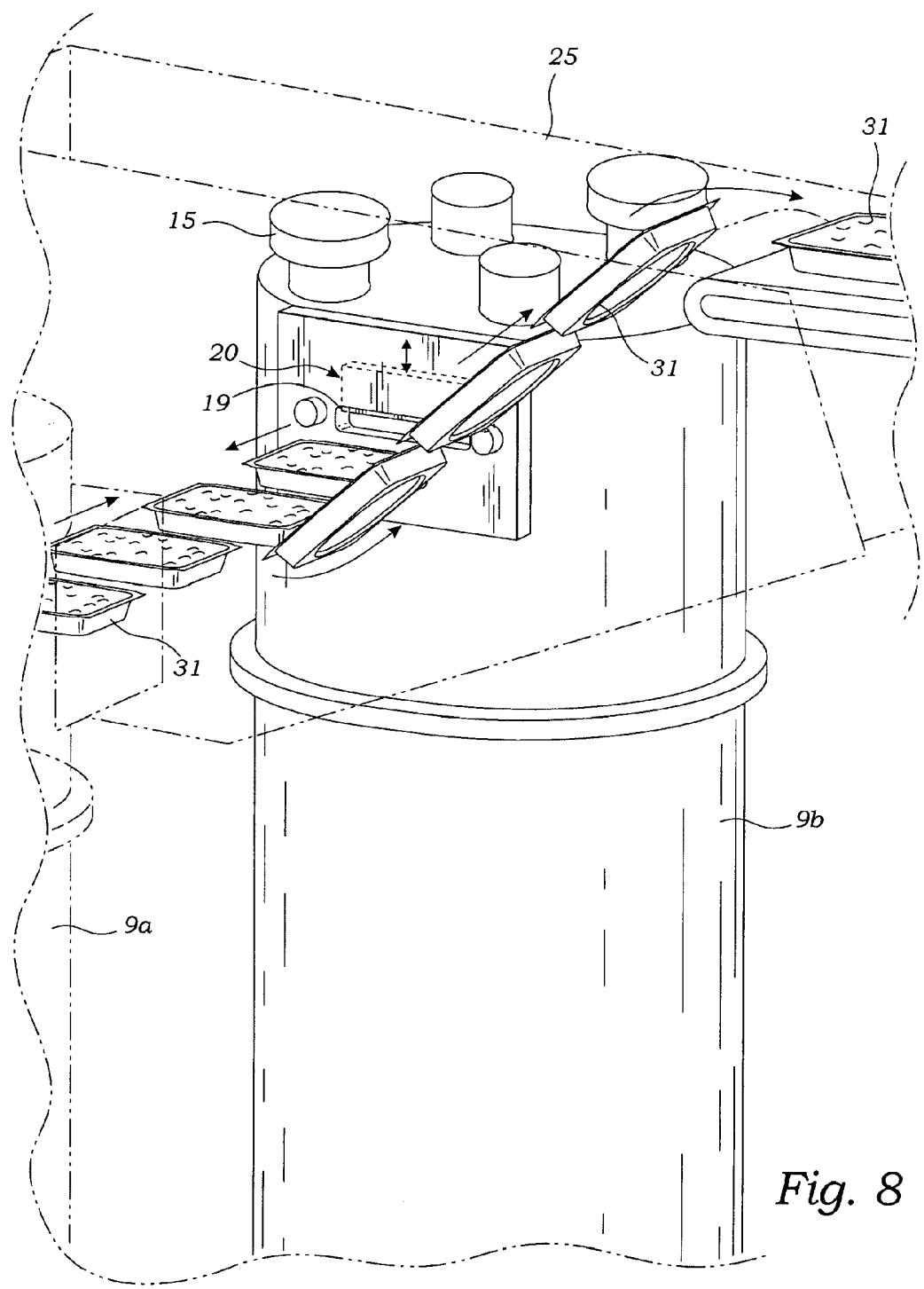
FIG. 8 is a close-up perspective view of the food processing system's outlet assembly illustrating the conveyance of food products.
Figure 13:
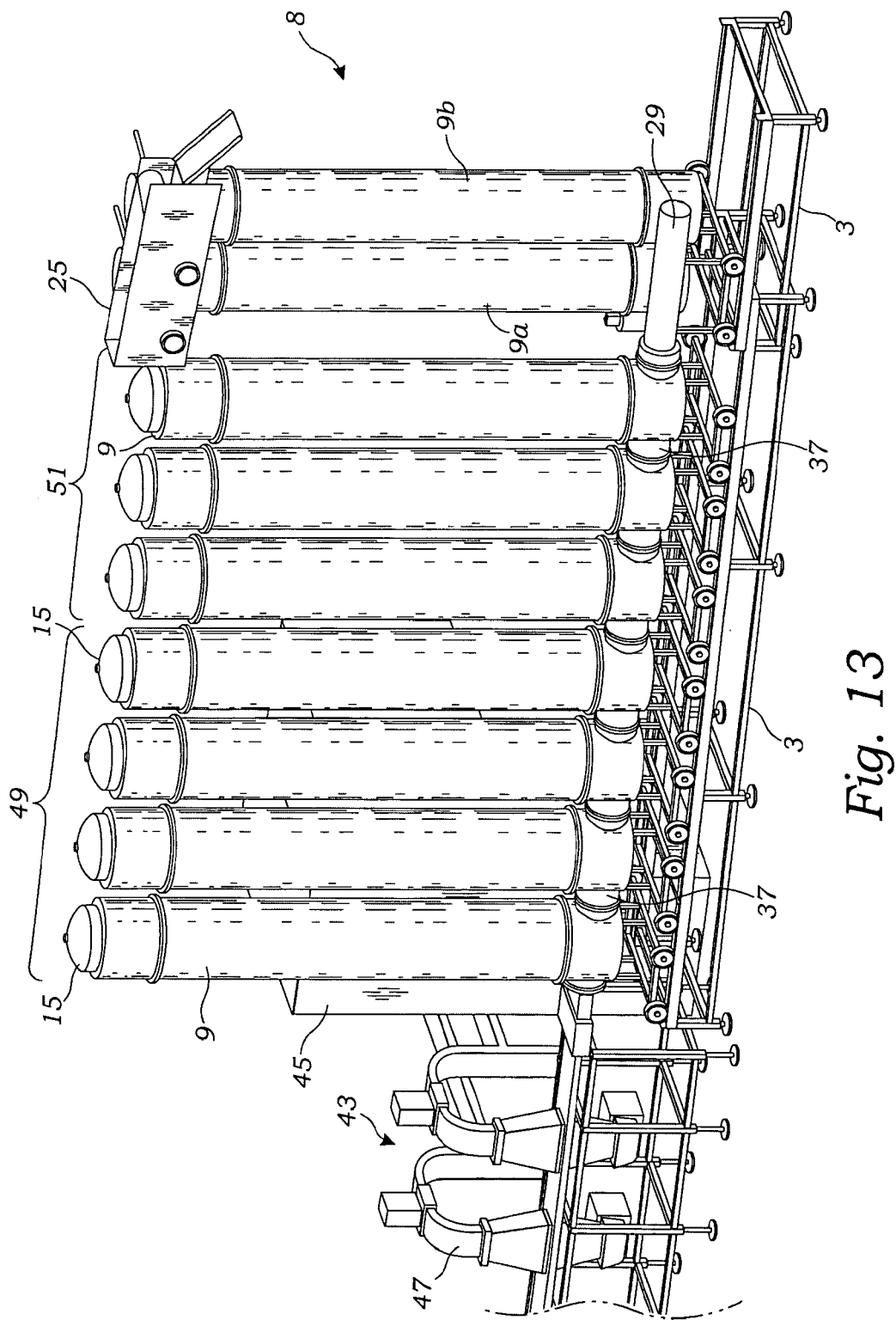
FIG. 13 is a close-up perspective view illustrating the outlet assembly having outlet screwstacks positioned side-by-side in an upline to downline configuration.

As illustrated in FIGS. 7 and 8, the outlet assembly 8 receives the food products 31 from the product cooling stage 51 through a connecting conduit 37. With reference also to FIGS. 11 and 13, the outlet assembly 8 has a construction very similar to the construction of the inlet assembly 6. Specifically, the outlet assembly includes a pair of screwstacks 9a and 9b. Like, the inlet assembly 6, the outlet screwstacks 9a and 9b may be positioned laterally adjacent to one another relative to the longitudinal path of the food processing system 1 as illustrated in FIGS. 1 and 7. Alternatively, as illustrated in FIGS. 11 and 13, the outlet screwstacks 9a and 9b may be positioned longitudinally adjacent to one another relative to food processing system 1. In addition, the outlet assembly includes a sorting chamber 29 which receives the food products from the product cooling stage 51 and conveys the food products to either the first or second outlet screwstack 9a or 9b. Each outlet screwstack includes a pair of screws 21 for transporting the food products from the screwstack's bottom extremity to the screwstack's top extremity. Each of the screws is rotated by motors 15 illustrated at the top of the screwstack. After being transported to an outlet screwstack's upper extremity, a mechanical actuator or the like forces the food products through an exit opening 19 formed in the screwstack sidewall to a sorting chamber 29. The sorting chamber 29 receives the food products 31 from either the first or second screwstack 9a or 9b, which in turn conveys the food products to an exit hopper 25. A conveyor belt 27 then transports the food products 31 from the exit hopper 25 for distribution.

The outlet assembly's screwstacks' inlet openings 17 near the bottom of the screwstacks and exit openings 19 near the top of the screwstacks are openable and closeable by an entry door 18 and exit door 20, respectively. Each of these doors provide a substantially liquid and gaseous tight seal so that the outlet screwstacks 9a and 9b can be filled with a liquid and pressurized. In the event that an outlet screwstack entry opening is open, the respective screwstack's exit opening is closed by the exit door 20. Conversely, in the event that the exit opening 19 is in an open condition, the outlet assembly's entry opening 17 is closed by an entry door 18. Thus, at least one of the outlet screwstack's doors are closed at any one time so as to maintain pressure within the pressurizeable tunnel 35.

In operation, the outlet assembly also operates in similar manner to the operation of the inlet assembly. The outlet screwstacks 9a and 9b are operated alternately so that as a first outlet screwstack 9a receives food products 31 through a sorting chamber 29 from the product cooling stage 51, the other screwstack 9b expels food products from its hollow interior to a second sorting chamber 29 for transportation to the exit hopper 25.

In order to control the various conveying apparatus, lever arms, mechanical actuators, and entry and exit doors, the food processing system 1 includes a control processor. The control processor can be designed by those skilled in the art without undue experimentation. The control processor may include one or more computer chips and one or more software programs for controlling the rotation of the screwstack screws, movement of the conveyor belts, movement of the mechanical lever arms and actuators, and opening and closing of the entry and exit doors so as to continuously move food products 31 through the food processing system 1.

In operation, preferably the entire food processing system, including inlet assembly 6, pressurizeable tunnel 35, and outlet assembly 8, is filled with a liquid such as water. As illustrated in FIG. 7, the water line 53 within the inlet and exit hoppers is sufficiently high so as to be above the chamber's entry or exit openings so that unwanted air cannot be introduced into the system. In addition, the food processing system includes an active and controllable pressure source (not shown) for maintaining the pressurizeable tunnel at an increased pressure, preferably at or above two atmospheres. The active pressure control system may include the use of pressurized cylinders, electric or combustion powered gas compressors, or hydraulic compressors, all of which may be controlled by the control processor.

While several particular forms of the invention have been illustrated and described, it will be apparent that various modifications can be made without departing from the spirit and scope of the invention. For example, the inlet, outlet and temperature maintenance screwstacks may be of any length and may store any number of food products. Preferably, the screwstacks are sufficiently tall to hold at least 10 food products within its interior. Even more preferably, each screwstack is sufficiently tall so as to hold 50 products or more within its interior. In the preferred embodiment, the screwstacks are sufficiently long that each pair of screws 21 which are approximately 8 feet long for storing approximately 60 packaged food products within the screw threads. Thus, preferred inlet and outlet screwstacks can store approximately 60 food products within their interior, while each maintenance screwstacks, with their two pairs of screws, can store approximately 120 food products within its interior.

Various changes to the conveyor system may also be made without departing from the spirit and scope of the invention. For example, the preferred embodiments described herein include a single conveyor belt supplying or retrieving food products to or from a hopper and sorting chamber. However, the sorting chamber may be eliminated by providing the inlet and/or outlet screwstacks with individual belts or the like to supply or receive food products.

Since changes can be made without departing from the spirit and scope of the invention, it is not intended that the invention be limited except to the following claims. Having described my invention in such terms so as to enable persons skilled in the art to understand the invention, recreate the invention and practice it, and having presently identified the preferred embodiments thereof,

I claim:

1. A screwstack prepackaged product transportation system comprising:
- a first hollow vessel having first and second ends, and having an inlet at said first end for introduction of prepackaged products and an outlet at said first end for the expulsion of prepackaged products; and
- a first pair of parallel screws positioned within said first hollow vessel for receiving prepackaged products at said first end and for engaging and transporting prepackaged products from said first end to said second end; and
- a second pair of parallel screws positioned within said first hollow vessel for receiving prepackaged products at said second end from said first pair of parallel screws and for engaging and transporting prepackaged products from said second end back to said first end for expulsion from said outlet.

2. The screwstack prepackaged product transportation system of claim 1 wherein said first hollow vessel is elongate and positioned vertically.

3. The screwstack prepackaged product transportation system of claim 1 wherein said first hollow vessel is elongate and positioned vertically, and said inlet and said outlet are positioned at the bottom of said vessel.

4. The screwstack prepackaged product transportation system of claim 1 wherein said first hollow vessel is filled with a liquid.

5. The screwstack prepackaged product transportation system of claim 1 wherein said first hollow vessel holds a plurality of prepackaged products.

6. The screwstack prepackaged product transportation system of claim 1 wherein said first hollow vessel holds at least 10 prepackaged products.

7. A method of transporting prepackaged products comprising the steps of:
- providing a screwstack comprising a first hollow vessel having first and second ends and having an inlet at the first end for introduction of prepackaged products, and an outlet at the first end for the expulsion of prepackaged products, the screwstack further comprising a first pair of parallel screws positioned within the first hollow vessel for receiving prepackaged products at the first end and for engaging and transporting prepackaged products from the first end to the second end, and the screwstack further comprising a second pair of parallel screws positioned within the first hollow vessel for receiving prepackaged products at the second end from the first pair of parallel screws and for engaging and transporting prepackaged products from the second end back to the first end for expulsion from the outlet;
- providing products packaged within packaging to form prepackaged products;
- positioning the prepackaged products in the inlet so as to simultaneously engage each of the first pair of parallel screws;
- transporting the prepackaged products from the inlet to the second end of the vessel by rotating each of the first pair of parallel screws; and
- transporting the prepackaged products from the second end of the vessel to the outlet for expulsion by rotating each of the second pair of parallel screws.

8. The method of transporting prepackaged products of claim 7 wherein said first hollow vessel is elongate and positioned vertically.

9. The method of transporting prepackaged products of claim 7 wherein said first hollow vessel is elongate and positioned vertically, and said inlet and said outlet are positioned at the bottom of said vessel.

10. The method of transporting prepackaged products of claim 7 wherein said first hollow vessel is filled with a liquid.

11. The method of transporting prepackaged products of claim 7 wherein said first hollow vessel holds a plurality of prepackaged products.

12. The method of transporting prepackaged products of claim 7 wherein said first hollow vessel holds at least 10 prepackaged products.

\* \* \* \* \*